US009068065B2

(12) United States Patent
Greiner et al.

(10) Patent No.: US 9,068,065 B2
(45) Date of Patent: Jun. 30, 2015

(54) HYDROLYTICALLY DECOMPOSABLE IONIC COPOLYMERS

(75) Inventors: Andreas Greiner, Amöneburg (DE); Seema Agarwal, Marburg (DE); Thomas Kissel, Staufen (DE); Liqun Ren, Mannheim (DE)

(73) Assignee: BASF SE, Ludwigshafen am Rhein (DE)

(*) Notice: Subject to any disclaimer, the term of this patent is extended or adjusted under 35 U.S.C. 154(b) by 520 days.

(21) Appl. No.: 12/937,631

(22) PCT Filed: Apr. 9, 2009

(86) PCT No.: PCT/EP2009/054318
§ 371 (c)(1),
(2), (4) Date: Dec. 3, 2010

(87) PCT Pub. No.: WO2009/127600
PCT Pub. Date: Oct. 22, 2009

(65) Prior Publication Data
US 2011/0160426 A1    Jun. 30, 2011

(30) Foreign Application Priority Data

Apr. 14, 2008    (DE) .................... 10 2008 018 905
Jun. 14, 2008    (DE) .................... 10 2008 028 146

(51) Int. Cl.
| | | |
|---|---|---|
| *C08F 20/06* | (2006.01) | |
| *C08L 101/16* | (2006.01) | |
| *C08F 8/44* | (2006.01) | |
| *C08F 220/34* | (2006.01) | |
| *C08F 216/38* | (2006.01) | |
| *C08F 220/14* | (2006.01) | |

(52) U.S. Cl.
CPC ................ *C08L 101/16* (2013.03); *C08F 8/44* (2013.01); *C08F 216/38* (2013.01); *C08F 220/14* (2013.01); *C08F 220/34* (2013.01); *C08F 2800/10* (2013.01)

(58) Field of Classification Search
CPC ........ C08F 216/38; C08F 220/34; C08F 8/44; C08F 220/14
USPC .............. 526/240, 266, 268, 270, 310, 317.1; 528/310, 360, 365
See application file for complete search history.

(56) References Cited

U.S. PATENT DOCUMENTS

| 4,923,941 A * | 5/1990 | Bailey .................... 526/268 |
| 6,534,610 B1 | 3/2003 | Wilson et al. |
| 2008/0063967 A1* | 3/2008 | Shin et al. .................. 430/109.3 |

FOREIGN PATENT DOCUMENTS

| CH | 686 185 | 1/1996 |
| DE | 39 30 097 | 3/1991 |
| DE | 43 07 759 | 4/1994 |
| EP | 0 795 573 | 9/1997 |
| EP | 1 267 953 | 1/2003 |
| JP | 02214719 | 8/1990 |
| WO | 03/002620 | 1/2003 |

OTHER PUBLICATIONS

Ren, Dissertation, 2008.*
Ren, Macromolecules 2007, p. 7834.*
Tomoo Suzuki, "Degradation of..by Microorganisms", Journal of Applied Polymer Science 35, 431-437, 1979.
John Wiley & Sons, "Encyclopedia of Polymer Science and Engineering", vol. 2, 220-243.
Liqun Ren et al., "Free-Radical Copolymerization . . . 2-(Acetoxymethyl)benzyl Methacrylate" Macromolecules 2007, 40, 7834-7841, XP-001509242.
Jean-Francois Lutz et al., "Biocompatible . . . Biorelevant Polymers", Macromolecules 2007, 40, 8540-8543, XP-00253417.
Database WPI Week 200018 Thomson Scientific, London, GB AN 2000-200865, XP-002535418.
Database WPI Week 199040 Thomson Scientific, London, GB AN 1990-302365, XP-002535419.
H. Wickel et al., "Homopolymers and . . . and 2D NMR", Macromolecules, 36, 2397-2403, XP-002535420, Mar. 13, 2003.
Liqun Ren et al., "Synthesis, Characterization . . . Poly[N-isopropylacrylamide]-co-ester]s", Macromolecule Chem. Phys. 2007, 208, 245-253.
Tomoo Suzuki, "Degradation of . . . by Microorganisms", Journal of Applied Polymer Science 35, 431-437, 1979.
John Wiley & Sons, "Encyclopedia of Polymer Science and Engineering", vol. 2, 220-243, Dec. 1985.

* cited by examiner

*Primary Examiner* — Gregory Listvoyb
(74) *Attorney, Agent, or Firm* — Clark & Brody

(57) ABSTRACT

The invention at hand provides hydrolytically degradable ionic copolymers. These ionic copolymerizates are composed of one cyclic ketene acetal A, one anionic or cationic methacrylic acid derivative B, selected from 2-methyl-methacrylate, [2-(2-methyl-1-methylene-allyloxy)]ethanesulfonate, [2-(2-methyl-1-methylene-allyloxy)ethyl]phosphonate or a quaternary amine of the N,N-dimethylaminoethylmethacrylic acid (DMAEMA) and, optionally, a neutral methacrylic acid derivative C.
The hydrolytically degradable anionic copolymers according to the present invention are produced by polymerizing the components A, B and C in the presence of a radical initiator under inert gas atmosphere and subsequent purification.
All copolymers according to the present invention are hydrolytically degradable. Copolymers comprising a maximum of 40 mol-% of ester groups in the backbone are additionally biodegradable, wherein in the case of cationic copolymers a maximum of 20 mol-% of quaternized DMAEMA is allowed to be available.
Cationic copolymers comprising at least 50 mol-% of the component B are antimicrobial.
Both anionic as well as cationic copolymers are suitable for producing nanoparticles. Cationic copolymers are suitable for being used as superhydrophobic materials as well as adhesives. Anionic copolymers are suitable for biodegradable thermoplastic elastomers and for biodegradable ionomers.

13 Claims, No Drawings

HYDROLYTICALLY DECOMPOSABLE IONIC COPOLYMERS

The invention at hand provides new, hydrolytically degradable ionic copolymerizates. These copolymerizates are formed from one cyclic ketene acetal, one anionic or cationic methacrylic acid derivative, and optionally one further methacrylic acid derivative. These ionic di- and terpolymers are produced by radical polymerization of the starting monomers in the presence of a radical initiator under inert gas atmosphere.

DESCRIPTION AND INTRODUCTION TO THE GENERAL AREA OF THE INVENTION

The invention at hand refers to the areas of macromolecular chemistry, polymer chemistry, biopharmacy and material sciences.

STATE OF THE ART

The invention at hand concerns hydrolytically degradable copolymers from cyclic ketene acetals and methacrylic acid derivatives. The copolymers according to the present invention comprise ester groups in the polymer backbone as well as ionic groups in the side chains.

It is known that polymers whose carbon backbone is interrupted by functional groups such as ester, amide, carbonate, urethane or ether groups and whose hydrocarbon moieties between the functional groups are predominantly of an aliphatic nature are suitable for being degraded by microorganisms. This is described, for example, in S. H. Huang, Encyclopedia of Polymer Sciences Vol. 2, 220-242. In contrast, polyolefins with a purely carbon backbone are resistant to a microbial attack. An exception is, for example, polyvinyl alcohol, which is completely degraded to carbon dioxide and water after oxidative cleavage (T. Suzuki et al., J Appl Polym Sci, Polym Symp. 35 (1973), 431). In contrast, polyvinyl acetate is only degraded with difficulty, since it initially has to largely hydrolyze to polyvinyl alcohol.

JP 02214719 A discloses polymers of olefins, acrylic esters, vinyl esters and styrenes with 2-methylene-1,3-dioxepane as hydrolysable polymerizates for use in marine paints.

DE 39 30 097 A1 describes UV-crosslinkable copolymerizates composed of cyclic olefinically unsaturated ring-opening polymerizing monomers, olefinically unsaturated monomers, preferably olefinically unsaturated esters, and copolymerizable olefinically unsaturated acetophenone or benzophenone derivatives. These polymers are suitable as coatings, for impregnating materials, or as adhesives and, in particular, as pressure-sensitive adhesives.

DE 43 07 759 C1 describes biodegradable copolymerizates of vinyl esters with cyclic ketene acetals. The copolymerizates are, however, not ionic.

U.S. Pat. No. 6,534,610 B1 discloses biodegradable copolymers composed of a first monomer from the group of the olefins and a second monomer which contains a hydrolytically cleavable group, for example one acetal, one ketal, one ester or one imide. Hereby, the hydrolysable groups of the copolymer according to the present invention are exclusively located in the main chain and never in a side chain. According to the theory of U.S. Pat. No. 6,534,610 B1, copolymers are better degradable, if the hydrolytically cleavable groups are located exclusively in the main chain. The production of the copolymers is carried out by transition metal catalyzed polymerization, preferably in the presence of metallocene or Brookhart catalysts.

EP 1 267 953 B1 describes compositions of crosslinkable prepolymers for biodegradable implants. The invention relates, in particular, to crosslinkable polyesters, polyorthoesters and polyacetal prepolymers which are suitable as in situ implants for bone and periodontal cavities.

Copolymers composed of cyclic, ring-opening ketene acetals and acrylic acid derivatives are known in the state of the art. However, no such copolymers are available to date which additionally comprise ionic groups.

Wickel et al. describe homopolymers and random copolymers of 5,6-benzo-2-methylene-1,3-dioexepane and methyl methacrylate in Macromolecules 2003, 36, 2397-2403. Ren and Agarwal describe coesters of 5,6-benzo-2-methylene-1,3-dioxepane and N-isopropylacrylamide in Macrom Chem Phys 2007, 208, 245-253. The hydrolytic and enzymatic degradation of terpolymers of two different PEG methalacrylates and 5,6-benzo-2-methylene-1,3-dioxepane is described in Lutz et al., Macromolecules 2007, 40, 8540-8543. However, none of the three works mentioned describes ionic copolymers.

In contrast, the invention at hand provides new copolymers which comprise biodegradable ester groups in the polymer backbone as well as ionic groups in the side chains. This is based on the known method consisting of introducing ester groups into a polyvinyl polymer backbone by a combination of free radical polymerization and radically ring-opening polymerization. Through the novel introduction of ionic groups into the side chains, surprisingly, ionic copolymers with new properties were found: The ionic copolymers according to the present invention biodegrade very well and, due to the ionic groups in the side chains, comprise new, surprising characteristics as compared to the known copolymers of dioxepanes and acrylic acid derivatives.

AIM

It is the aim of the invention at hand to provide hydrolytically degradable polyionic compounds which comprise ionic groups in the side chains, along with ester groups in the polymer backbone and in the side chains, as well as methods for the production of these hydrolytically degradable polyionic compounds.

ACHIEVEMENT OF THIS AIM

The aim to provide hydrolytically degradable polyionic compounds is achieved, according to the present invention, through polyionic copolymerizates which are composed of a) 10 to 55 mol-% of a cyclic ketene acetal A, b) 4 to 90 mol-% of a methacrylic acid derivative B, c) 0 to 80 mol-% of a methacrylic acid derivative C, wherein the sum of A, B and C results in 100 mol-%, and wherein the cyclic ketene acetal A is selected from

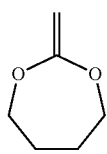

(I)

2-methylene-1,3-dioxepane
(MDO)

-continued

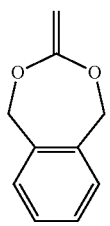

5,6-benzo-2-methylene-1,3-dioxepane (BMDO)    (II)

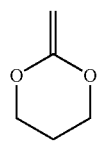

2-methylene-1,3-dioxane    (III)

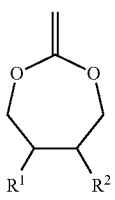

5,6-dialkyl-2-methylene-1,3-dioxepane    (IV)

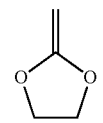

2-methylene-1,3-dioxolane    (V)

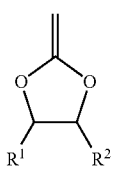

4,5-dialkyl-2-methylene-1,3-dioxolane    (VI)

wherein $R^1$ and $R^2$ stand independently of one another for a linear or branched alkyl group with 1 to 12 carbon atoms, and the methacrylic acid derivative B is selected from 2-methyl-methacrylate (VII)

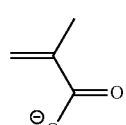
(VII)

[2-(2-methyl-1-methylene-allyloxy)]ethanesulfonate (VIII)

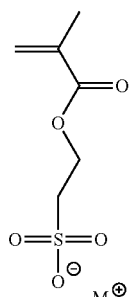
(VIII)

[2-(2-methyl-1-methylene-allyloxy)ethyl]phosphonate (IX)

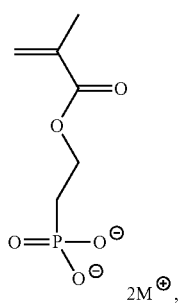
(IX)

wherein $M^+$ represents a lithium, sodium, potassium, ammonium or tetraalkylammonium cation and the polyionic copolymerizate is an anionic copolymerizate, N,N-dimethylaminoethylmethacrylic acid (DMEAMA) according to formula (Xa)

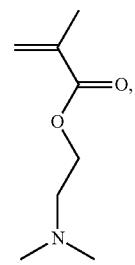
(Xa)

wherein 45% to 95% of the DMEAMA are available ionized in the form of a quaternary amine of the formula (Xb),

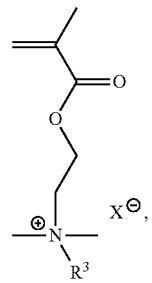
(Xb)

in such a way that the polyionic copolymerizate is a cationic copolymerizate, wherein
R³ stands for a linear or branched alkyl group with 1 to 12 carbon atoms or a benzyl group of the formula (XI)

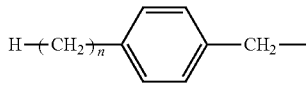

(XI)

where n=0-12 and X⁻ stands for fluorine, chloride or bromide,
and wherein the methacrylic acid derivative C is selected of compounds according to formula (XII)

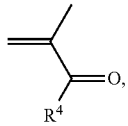

(XII)

wherein R⁴ is selected from
—OCH₃, —N(CH₃)₂, an oligoethylene glycol of the general formula
—O—(CH₂—CH₂—O)$_m$H, an □-methoxy-oligoethylene glycol of the general formula
—O—(CH₂—CH₂—O)$_m$—CH₃, wherein m represents a natural number between 1 and 12,
vinyl acetate, acrylonitrile, 2-hydroxyethyl methacrylate, N-vinylformamide, N-vinylacetamide, N-methyl-N-vinylacetamide, N-vinylcaprolactame, N-vinylpyrrolidone, N-2-hydroxypropylmethacrylamide, N-3-hydroxypropylmethacrylamide, N,N-dimethylacrylamide, styrene, N,N-dimethylaminostyrene.

Surprisingly, it has been found that the copolymerizates according to the present invention, which comprise ionic groups in the side chains as well as ester groups in the polymer backbone and in the side chains, are hydrolytically degradable. The ionic groups are able to be cationic or anionic groups.

In the frame of the invention at hand, "copolymers" are understood to be such polymers which comprise several types of monomers. Thus, the products of the reaction of several types of monomers are called "copolymerizates".

Hydrolytically degradable means that the ionic copolymers according to the present invention comprise a hydrolyzable component in their polymer backbone, which enables the fragmentation of the copolymers into smaller degradation products when they are exposed to water.

"Cationic" groups are understood to be organic cations; in the invention at hand these are quaternary ammonium groups.

Analogously, "anionic" groups refer to organic anions, wherein these are methacrylates, sulfonates and phosphonates in the frame of the invention at hand. The ionic groups are based on uncharged amino, methacrylic acid, sulfonic acid or phosphonic acid groups. These groups are suitable for being ionized, i.e. they are able to be converted into the corresponding cations or anions, respectively.

According to the present invention, the ionic and/or ionizable groups are located in the side chain of the copolymers according to the present invention.

Under "ionic groups", it is understood that the methacrylic acids, sulfonic acids, phosphoric acids or amino groups are available in the form of their corresponding salts. In the case of methacrylic acids, sulfonic acids and phosphonic acids, these corresponding salts are tetraalkylamines, lithium, sodium, potassium or ammonium salts of the respective methacrylates, sulfonates and phosphonates. In the case of N,N-dimethylaminoethylmethacrylic acid (DMEAMA), the corresponding ionic groups are quaternary ammonium salts according to the formula (Xb).

"Ionizable groups" are, thus, uncharged methacrylic acid, sulfonic acid, phosphonic acid and N,N-dimethylaminomethacrylic acid groups.

Copolymerizates according to the present invention, comprising ionic groups according to the definition above, are hereinafter also called "ionic copolymerizates" for short and, analogously, the term "ionic copolymers" is used hereinafter.

If the ionic and/or ionizable groups are amino groups or their corresponding quaternary amines, then the copolymerizates or copolymers, respectively, are called "cationic copolymerizates" or "cationic copolymers" respectively.

If the ionic or ionizable groups are methacrylic acids, sulfonic acids or phosphoric acid or their corresponding salts, then the copolymerizates or copolymers, respectively, are called "anionic copolymerizates" or "anionic copolymers" respectively.

The polyionic copolymerizates according to the present invention are externally electrically neutral, since the charge of the ionic groups is counterbalanced by oppositely charged ions. In the case of quaternary ammonium groups, the counterions are preferably halides, selected from fluorine, chloride and bromide. In the case of methacrylic acids, sulfonic acids or phosphonic acids, the counterions are preferably lithium, sodium, potassium, ammonium and tetraalkylammonium ions. Cyclic ketene acetals A are selected from 2-methylene-1,3-dioxepane (MDO), 4,5-dialkyl-2-methylene-1,3-dioxolane, 5,6-benzo-2-methylene-1,3-dioxepane (BMDO), 5,6-dialkyl-2-methylene-1,3-dioxepane, 2-methylene-1,3-dioxane and 2-methylene-1,3-dioxolane:

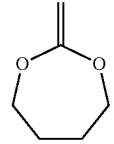

(I)

2-methylene-1,3-dioxepane
(MDO)

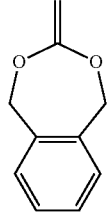

(II)

5,6-benzo-2-methylene-1,3-dioxepane
(BMDO)

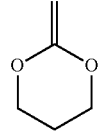

(III)

2-methylene-1,3-dioxane

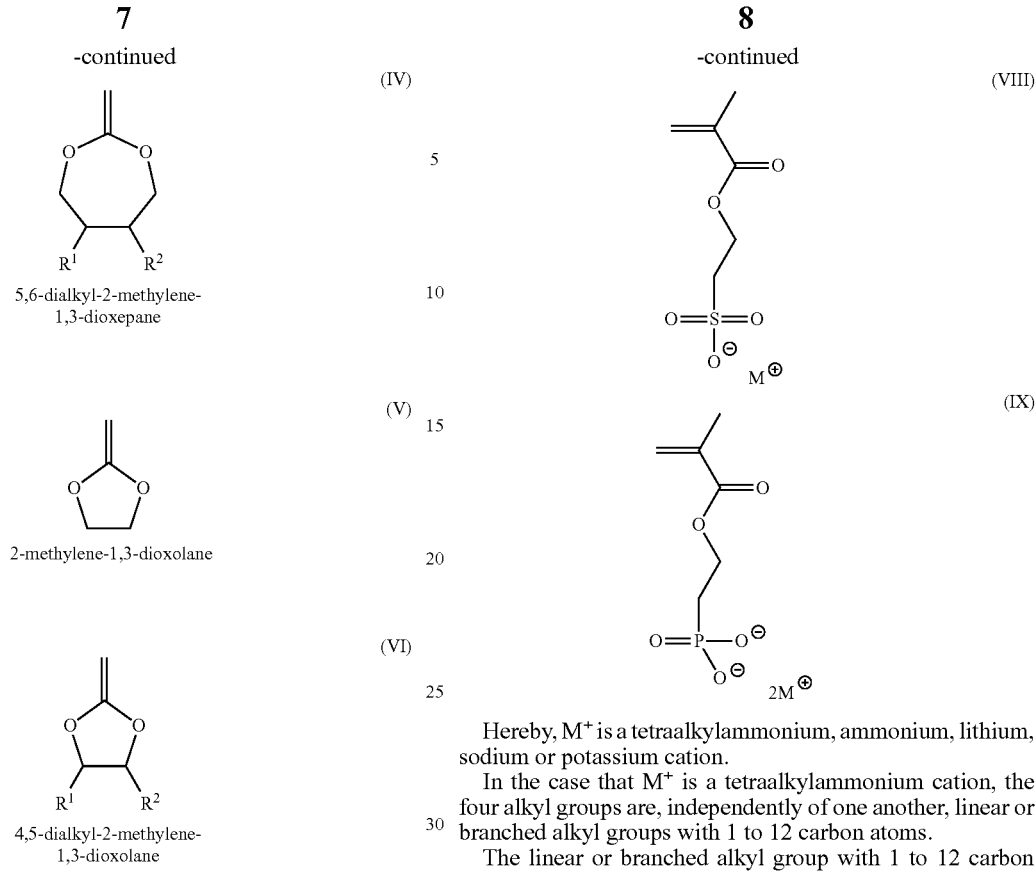

(IV)

5,6-dialkyl-2-methylene-
1,3-dioxepane (V)

2-methylene-1,3-dioxolane (VI)

4,5-dialkyl-2-methylene-
1,3-dioxolane

In the case of 5,-6-dialkyl-2-methylene-1,3-dioxepane (IV) and 4,5-dialkyl-2-methylene-1,3-dioxolane (VI), $R^1$ and $R^2$ stand independently of one another for a linear or branched alkyl group with 1 to 12 carbon atoms.

The linear or branched alkyl group with 1 to 12 carbon atoms is selected, for example, from methyl, ethyl, n-propyl, isopropyl, 1-butyl, 2-butyl, tert.-butyl, 1-pentyl, 1-hexyl, 1-heptyl, 1-octyl, 1-nonyl, 1-decyl, 1-undecyl, 1-dodecyl.

The ratio of the cyclic ketene acetal A in the hydrolytically degradable polyionic copolymerizate according to the present invention is at least 10 mol-%. Hereby, 2-methylene-1,3-dioxepane (MDO) and 5,6-benzo-2-methylene-1,3-dioxepane are preferable.

The hydrolytically degradable polyionic copolymerizates according to the present invention comprise 4 to 90 mol-% of a methacrylic acid derivative B.

Methacrylic acid derivatives B are selected from 2-methylmethacrylate (VII), 2-(2-methyl-1-methylene-allyloxy) ethanesulfonic acid (VIII) and [2-(2-methyl-1-methylene-allyloxy)ethyl]phosphonic acid (IX), if the biodegradable copolymerizates according to the present invention are anionic copolymerizates.

(VII)

Hereby, $M^+$ is a tetraalkylammonium, ammonium, lithium, sodium or potassium cation.

In the case that $M^+$ is a tetraalkylammonium cation, the four alkyl groups are, independently of one another, linear or branched alkyl groups with 1 to 12 carbon atoms.

The linear or branched alkyl group with 1 to 12 carbon atoms is selected, for example, from methyl, ethyl, n-propyl, isopropyl, 1-butyl, 2-butyl, tert.-butyl, 1-pentyl, 1-hexyl, 1-heptyl, 1-octyl, 1-nonyl, 1-decyl, 1-undecyl, 1-dodecyl.

If the hydrolytically degradable copolymerizate according to the present invention is a cationic copolymerizate, then the methacrylic acid derivative B is a derivative of N,N-dimethylaminoethylmethacrylic acid (DMEAMA) according to formula (Xa)

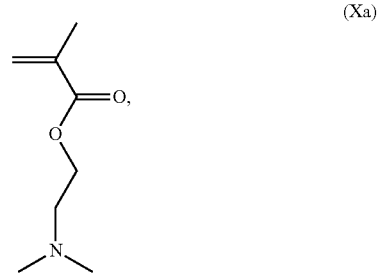

(Xa)

wherein 45% to 90% of the DMEAMA are available ionized in form of a quaternary amine of the formula (Xb),

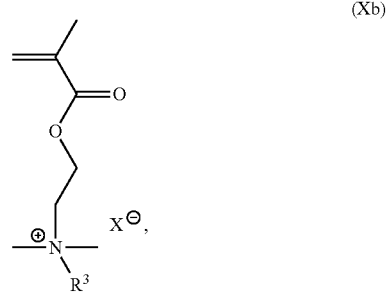

(Xb)

wherein
R³ represents a linear or branched alkyl group with 1 to 12 carbon atoms or a benzyl group of the formula (XI)

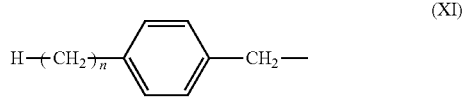

(XI)

where n=0-12 and X⁻ stands for fluorine, chloride or bromide. Hereby, bromides are preferable to fluorines and chlorides.

The linear or branched alkyl group with 1 to 12 carbon atoms is selected, for example, from methyl, ethyl, n-propyl, isopropyl, 1-butyl, 2-butyl, tert.-butyl, 1-pentyl, 1-hexyl, 1-heptyl, 1-octyl, 1-nonyl, 1-decyl, 1-undecyl, 1-dodecyl.

Those quaternary amines according to formula XI, in which R³ is selected from ethyl, n-butyl, n-hexyl, n-octyl, n-dodecyl, are preferable.

The hydrolytically degradable polyionic copolymerizates according to the present invention comprise 0 to 80 mol-% of a methacrylic acid derivative C.

The methacrylic acid derivative C is selected from compounds according to formula (XII)

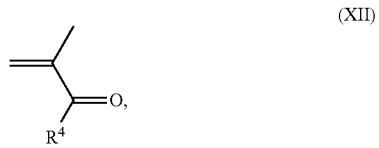

(XII)

wherein R⁴ is selected from —OCH₃, —N(CH₃)₂, an oligoethylene glycol of the general formula —O—(CH₂—CH₂—O)ₘH and an □-methoxy-oligoethylene glycol of the general formula —O—(CH₂—CH₂—O)ₘ—CH₃, wherein m represents a natural number between 1 and 12.

The methacrylic acid derivative C is preferably selected from oligoethylene glycol methacrylate (more precisely: nonaethylene glycol methacrylate) OEGMA, 2-(2-methoxyethoxy)ethyl methacrylate (MEO₂MA), methylmethacrylate (MMA), N,N,2-trimethylacrylamide and 2-methylacrylic acid (2-hydroxyethyl)ester:

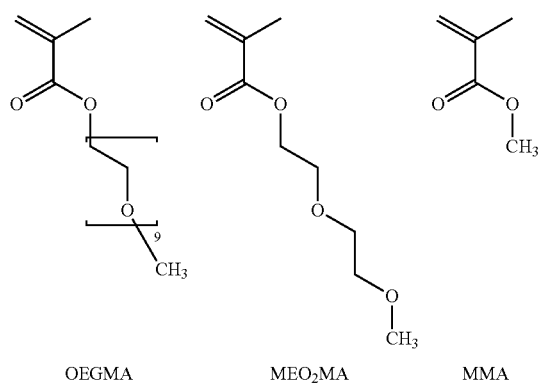

OEGMA  MEO₂MA  MMA

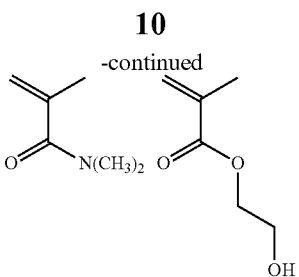

-continued

The hydrolytically degradable copolymers according to the present invention comprise a number average molecular weight Mn of 10,000 to 100,000. This is valid both for dipolymers and terpolymers.

The ionic copolymerizates are composed of
a) 10 to 55 mol-% of a cyclic ketene acetal A, selected from MDO and BMDO
b) 4 to 90 mol-% of a methacrylic acid derivative B,
c) 0 to 80 mol-% of a methacrylic acid derivative C,
wherein the sum of A, B and C results in 100 mol-%. Hereby, MDO, BMDO, B and C are as defined above.

In a further preferable practical embodiment, the ionic copolimerizates are composed of
a) 10 to 55 mol-% of a cyclic ketene acetal A,
b) 4 to 90 mol-% of a methacrylic acid derivative B,
c) 0 to 80 mol-% of a methacrylic acid derivative C, selected from oligoethylene glycol methacrylate OEGMA, 2-(2-methoxyethoxy)ethyl methacrylate (MEO₂MA), methylmethacrylate (MMA), N,N,2-trimethylacrylamide and 2-methacrylic acid (2-hydroxyethyl)ester
wherein the sum of A, B and C results in 100 mol-%. Hereby, A, B, OEGMA, MEO₂MA and MMA are as defined above.

In a further preferable practical embodiment, the ionic copolimerizates are composed of
a) 10 to 55 mol-% of a cyclic ketene acetal A,
b) 4 to 90 mol-% of the methacrylic acid derivative DMAEMA, wherein 45% to 95% are available ionized in the form of a quaternary amine of the formula (Xb),
c) 0 to 80 mol-% of a methacrylic acid derivative C,
wherein the sum of the components A, B and C results in 100 mol-%. Hereby, A, DMAEMA and C are as defined above.

In a further preferable practical embodiment, the ionic copolimerizates are composed of
a) 10 to 55 mol-% of a cyclic ketene acetal A,
b) 4 to 90 mol-% 2-methyl-methacrylate according to formula (VII),
c) 0 to 80 mol-% of a methacrylic acid derivative C,
wherein the sum of the components A, B and C results in 100 mol-%. Hereby, A and C are as defined above.

In a further preferable practical embodiment, the ionic copolimerizates are composed of
a) 10 to 55 mol-% of a cyclic ketene acetal A,
b) 4 to 90 mol-% [2-(2-methyl-1-methylene-allyloxy)-ethyl]ethanesulfonate according to formula (VIII),
c) 0 to 80 mol-% of a methacrylic acid derivative C,
wherein the sum of the components A, B and C results in 100 mol-%. Hereby, A and C are as defined above.

In a further preferable practical embodiment, the ionic copolimerizates are composed of
a) 10 to 55 mol-% of a cyclic ketene acetal A,
b) 4 to 90 mol-% [2-(2-methyl-1-methylene-allyloxy)-ethyl]phosphonate according to formula (IX),
c) 0 to 80 mol-% of a methacrylic acid derivative C,
wherein the sum of the components A, B and C results in 100 mol-%. Hereby, A and C are as defined above.

In a further preferable practical embodiment, the ionic copolimerizates are composed of a) 10 to 55 mol-% of a cyclic ketene acetal A, b) 4 to 90 mol-% of a methacrylic acid derivative B, c) 0 mol-% of a methacrylic acid derivative C, wherein the sum of the components A and B results in 100 mol-%, in such a way that it is a dipolymer. Hereby, A, B and C are as defined above.

In a further preferable practical embodiment, the ionic copolimerizates are composed of a) 10 to 55 mol-% of a cyclic ketene acetal A, selected from MDO and BMDO, b) 4 to 90 mol-% DMAEMA, which is available between 45% to 95% in the form of a quaternary amine c) 0 to 80 mol-% of a methacrylic acid derivative C, wherein the sum of the components A, B and C results in 100 mol-% and wherein the quaternary amine of the DMAEMA as well as the methacrylic acid derivative C are as defined above.

In a further particularly preferable practical embodiment, the ionic copolimerizates are composed of a) 10 to 55 mol-% of a cyclic ketene acetal A, selected from MDO and BMDO, b) 4 to 90 mol-% DMAEMA, which is available between 45% to 95% in the form of a quaternary amine c) 0 to 80 mol-% MMA, wherein the sum of the components A, B and C results in 100 mol-% and wherein the quaternary amine of the DMAEMA is as defined above.

All ionic copolymers according to the present invention—both the cationic and the anionic—are hydrolytically degradable according to the definition above.

Furthermore, such ionic copolymers according to the present invention, which comprise at least 40 mol-% of ester groups in the polymer backbone, have been examined as regards their biodegradability. In the case of cationic copolymers according to the present invention, the copolymers additionally comprised a maximum of 20% of the cationic groups, i.e. a maximum of 20 mol-% of the cationic copolymer referred to quaternary amines of DMAEMA.

It has been found that these aforementioned ionic copolymers according to the present invention are biodegradable, for example, if they are mixed with normal compost.

Under biodegradable, it is hereby understood that a compound (here: a copolymer according to the present invention) is decomposed by enzymes and/or microorganisms into smaller degradation products. Hereby, such enzymes and microorganisms which are found in composts, are preferable.

Furthermore, the antimicrobial effect of the cationic copolymers according to the present invention has been examined. It was found that the cationic copolymers according to the present invention are antimicrobial, if they comprise at least 50 mol-% of the component B, thus, a quaternary amine of DMAEMA according to the aforementioned definition of component B. These are, for example, components B according to formula (XIII):

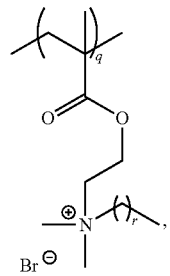

(XIII)

hereby q stands for the chain length of the component B and r is a natural number between 1 and 11.

The antimicrobial effect has been shown with the help of *Eschericia coli* for both dipolymers as well as terpolymers.

Under antimicrobial, it is understood that a substance (here: a cationic copolymer according to the present invention) reduces the reproductive capacity or the infectivity of microorganisms, or kills or inactivates them, respectively.

In summary, it should be kept in mind, that a) cationic copolymers comprising at least 40 mol-% A and simultaneously a maximum of 20 mol-% are biodegradable, b) cationic copolymers comprising at least 50 mol-% are antimicrobial, independently of how much mol-% of the component A it comprises.

This is valid both for cationic dipolymers and cationic terpolymers.

The anionic copolymerizates are produced by polymerizing the components A, B and C in the presence of a radical initiator under inert gas atmosphere and subsequently purifying the obtained ionic copolymer. Hereby, the component B is selected from a methacrylate (I), a sulfonate (II) and a phosphonate (III) according to the definition above.

The cationic copolymerizates according to the present invention are produced by a method comprising the following steps:

a) free radical copolymerization of the components A, DMAEMA and C in the presence of a radical initiator under inert gas atmosphere, b) purification of the obtained neutral copolymer, c) reaction of the neutral copolymer with a quaternization reagent in such a way that 45 to 95% of DMAEMA are quaternized, d) purification of the ionic copolymer obtained in this way.

Hereby, component B is DMAEMA (Xa).

The copolymer obtained in this way is neutral, since unquaternized DMAEMA is used. The reaction of the neutral copolymer to the ionic copolymer according to step c) is carried out through reaction with a quaternization reagent selected from a primary halogen alkane with 1 to 12 carbon atoms, wherein the carbon chain is able to be linear or branched, and a benzyl halide of the general formula

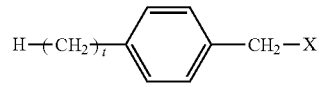

(XIV)

where t=0 to 12, wherein X stands for a halogen atom and the halogen is selected from fluorine, chlorine and bromine in the case of the primary halogen alkane, as well as in the case of the benzyl halide. Hereby, bromoalkanes and benzylbromides are preferable.

For that purpose, the neutral copolymer obtained after the execution of step b) is dissolved in an aprotic solvent and subsequently reacted with a halogen alkane or benzyl halide according to the definition above.

If the boiling point of the quaternization reagent is above 60° C., the quaternization reaction occurs advantageously at temperatures between 40° C. and 45° C. If the boiling point of the quaternization reagent is, however, under 60° C., the quaternization reaction occurs at room temperature.

The degree of quaternization is able to be controlled by the reaction time.

At a given combination of neutral copolymer and quaternization agent, a prolongation of the reaction time causes a higher quaternization degree. At a given combination of neutral copolymer and reaction time, the use of shorter-chained quaternization reagents causes higher quaternization degrees.

Persons skilled in the art are able to determine through routine experiments, with the help of their knowledge and without leaving the scope of protection of the patent claims, which combination of neutral copolymer, quaternization reagent and reaction time causes which quaternization degree.

Alternatively, cationic copolymerizates according to the present invention are able to be produced by first quaternizing DMAEMA and, subsequently, radically polymerizing the quaternized DMAEMA with the components A and C in the presence of a radical initiator under inert gas atmosphere.

The free radical copolymerization of the components A, B and C is carried out in all aforementioned cases, by providing A, B and C together with a radical initiator in a reaction vessel under inert gas atmosphere. Oxygen which might be present is removed by freezing and unfreezing the reaction mixture once.

Suitable radical initiators are, for example, azobisisobutyronitrile (AIBN), dibenzoylperoxide (DBPO) and di-tert.butyl-hyponitrite (DTBHN). Further radical initiators are known by persons skilled in the art and are suitable for being used without leaving the scope of protection of the patent claims.

Suitable inert gases are, for example, argon, nitrogen, carbon dioxide and mixtures thereof.

The radical copolymerization is preferably carried out at temperatures between 70° C. and 120° C. The preferable temperature depends on the initiator. With the use of AIBN, for example, a temperature of approx. 70° C. is preferable, while one polymerizates preferably at approx. 120° C. with the use of di-tert. peroxides. It is known to persons skilled in the art which temperature range should be selected with which initiator.

The neutral or ionic copolymer respectively is purified by dissolving it in a first organic solvent and precipitating it by addition of a second solvent. In order to dissolve the neutral copolymer, chloroform and DMF are, for example, suitable.

If a short-chained alkyl bromide $BrC_pH_{2p+1}$, $p \le 4$, is selected for the quaternization, a mixture of chloroform and an alcohol, for instance methanol, is preferable as a solvent. The neutral copolymers dissolve well in chloroform. The ionic copolymers formed during the quaternization do not dissolve well any more in pure chloroform, so that the solvent becomes cloudy with increasing quaternization of the copolymer. In this case, an alcohol, e.g. methanol, should be added until the solvent becomes clear again.

In order to precipitate the ionic copolymers, an alkane is suitable, for example n-pentane or n-hexane.

The ketene acetal (component A) reacts up to approx. 40-60%, so that the amount of the ketene acetal used is approximately twice as high as the ratio of the ketene acetal in the product.

If the ratio of the ketene acetal (component A) in the mixture of starting materials is up to 50 mol-%, then the polymerization reaction is terminated after 5 hours. This is valid for the entire temperature range of the method according to the present invention, namely between 70° C. and 120° C., and independently of the production of a dipolymer or a terpolymer (cf. practical embodiments 4 and 6).

If the ratio of the ketene acetal in the mixture of starting materials is, however, more than 50 mol-%, then the polymerization preferably occurs at a temperature of 120° C. Hereby, it is advantageous to extend the reaction time to 12-16 hours. It is known to persons skilled in the art that an increase of the reaction temperature and/or extension of the reaction time is able to increase the yield of a reaction.

The ionic copolymers according to the present invention comprise 30-70 mol-% ester units.

In the case of cationic copolymers according to the present invention, the water solubility is able to be controlled and targetedly adjusted through the ratio of ester units as well as the length of the alkyl groups. In this way, the most different cationic copolymers from very hydrophobic to very hydrophilic, are able to be produced.

The ionic copolymers according to the present invention comprise a random structure, i.e. the monomer units of the individual components A, B and, where necessary, C are statistically distributed in the copolymer.

Alternatively, ionic copolymers with block structure are also able to be produced. In such a block copolymer, the monomers alternate blockwise, i.e. one section polymer of a pure monomer component A alternates with a section of a pure monomer component B or C.

The ionic copolymers according to the present invention are able to be used as hydrolytically degradable ionomers. According to IUPAC, an ionomer is understood to be a macromolecule in which a small, yet significant ratio of the constitutional units comprises ionizable or ionic groups. A constitutional unit is an atom or a group of atoms (with possibly further atoms or groups bound thereto) which comprises a part of the significant structure of a macromolecule, an oligomer, a block or a chain.

The ionic copolymers according to the present invention are suitable for numerous applications in biomedicine and material sciences.

Ionic copolymers according to the present invention are particularly advantageous, since each of the components comprised in the copolymer causes particular properties:

The cyclic ketene acetals provide ester bonds in the backbone of the polymer, which are the reason for the hydrolytic degradability. The cationic and anionic groups, respectively, provide binding sites for other molecules, for example for biomolecules. If these are ionic terpolymers according to the present invention, the water solubility is able to be adjusted in a targeted manner with the help of the methacrylic acid derivatives C, for example with the help of methoxy-oligo-(ethylene glycol) methacrylates. Furthermore, methoxy-oligo-(ethylene glycol) methacrylates are able to mask the terpolymers according to the present invention in biomedical applications against the immune system. With the help of methacrylates, the glass temperature of the ionic copolymers according to the present invention is further able to be targetedly adjusted. Likewise, the thermoresponsive characteristics are suitable for being targetedly modified through methacrylates, so that methacrylate-containing copolymers according to the present invention are suitable for injectable biodegradable polyions for biomedical applications, e.g. for drug release.

Both anionic as well as cationic copolymers are suitable for producing nanoparticles. Nanoparticles of this type comprise, for example, higher efficiency in the encapsulation of pharmaceutically active agents and higher stability compared to shear forces than previous substances in the area of material sciences as well.

Cationic copolymers are suitable for being used, for example, as superhydrophobic materials, as well as antibacterial transparent coatings, e.g., for wood. Particular emphasis should, however, be placed on the suitability of the cationic copolymers as adhesives. It was able to be shown that they, for example, create a permanent, water- and temperature-stable adhesive bond between wood and metal, glass or a further piece of wood; metal and glass are able to be adhered equally as well. The adhesive characteristics occur with cationic dipolymers and terpolymers, which comprise at least 4 mol-% quaternized DMAEMA, in relation to the whole polymer.

Anionic copolymers are suitable, for example, for biodegradable, thermoplastic elastomers, biodegradable ionomers, vehicles for drug delivery, as transfection agents, as well as carriers for aerosol therapies and gene therapies.

EMBODIMENTS

Embodiment 1

Production of Neutral Copolymerizates from BMDO and DMAEMA

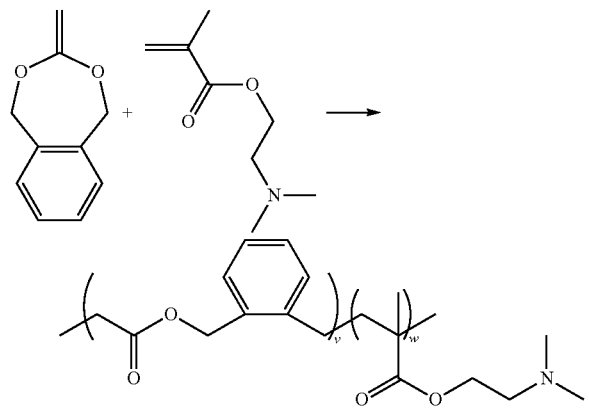

Schematic representation of the copolymerization of BMDO and DMAEMA; hereby, v and w stand for the chain lengths of BMDO and DMAEMA in the finished dipolymer.

Initially, 5,6-dibenzo-1,3-dioxepane (BMDO) and N,N-dimethylaminoethylmethacrylate (DMAEMA) were copolymerized through free radical polymerization, in order to produce the hydrolytically degradable polymethacrylic acid amine precursors. Subsequently, the precursors were quaternized with the help of alkyl bromide, in order to obtain the hydrolytically degradable polycations according to the present invention.

All copolymerizations were carried out under argon atmosphere in pre-dried Schlenk tubes. Azobisisobutyronitrile (AIBN) was used as the initiator for the free radical polymerization. In a typical polymerization reaction, two monomers—BMDO (0.571 g 5 mmol) and DMAEMA (0.786 g 5 mmol)—were provided with 1 mol-% of the initiator (in relation to the entire concentration of the monomers) in a Schlenk tube under argon atmosphere. Low residuals of oxygen were removed through freezing once and unfreezing from the tube. The reaction was started through immersion of the reaction tube in a preheated oil bath at 70° C. After 5 h reaction time, the reaction mixture was diluted with $CHCl_3$ and precipitated with approx. 200 ml n-hexane. The copolymers were purified through dissolving in $CHCl_3$ and precipitating from n-hexane. The copolymers were dried in vacuum at 40° C. until a constant weight. The microstructure of the copolymers was characterized through 1D- and 2D-NMR. Through modification of the molar ratios of both monomers BMDO and DMAEMA in the mixture of starting materials, different copolymers were produced. Hereby, the aforementioned reaction conditions were maintained.

Table 1 shows the results of the free radical copolymerization of 5,6-dibenzo-2-methylene-1,3-dioxepane (BMDO) and N,N-dimethylaminoethylmethacrylate B=BMDO; D=DMAEMA

| Mixture of starting materials (molar ratio) B:D | Copolymer composition B:D (molar ratio) | reaction time (h)/ reaction temperature °C. | Conversion (%) | Molar mass/ polydispersity | Solubility |
|---|---|---|---|---|---|
| 25:85 | 10:90 | 5/120 | 74 | 11,000/1.3 | DMF: yes $CHCl_3$: yes THF: no |
| 35:65 | 16:84 | 5/120 | 68 | 15,260/1.36 | DMF: yes $CHCl_3$: yes THF: no |
| 45:55 | 21:79 | 5/120 | 64 | 14,000/1.35 | DMF: yes $CHCl_3$: yes THF: no |
| 65:35 | 30:70 | 18/70 | 30 | 12,000/1.43 | DMF: yes $CHCl_3$: yes THF: no |
| 85:15 | 48:52 | 20/70 | 28 | 11,000/1.30 | DMF: yes $CHCl_3$: yes THF: yes |
| 0:100 | 0:100 | 6/120 | 76 | 16,000/1.3 | DMF: yes $CHCl_3$: yes THF: not good |

Embodiment 2

Quaternization of the Neutral Copolymers from BMDO and DMAEMA

Finally, the neutral copolymers were quaternized:

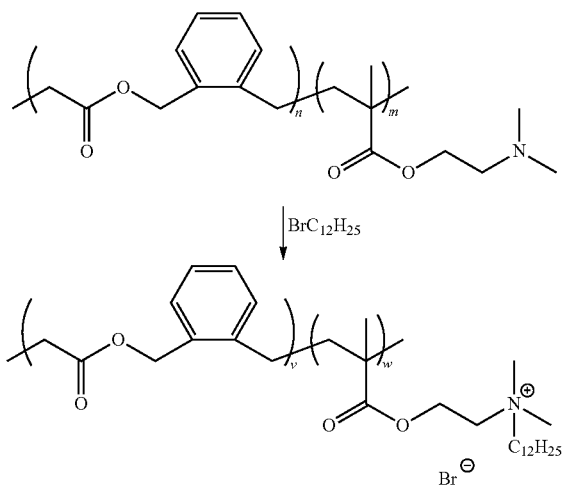

Schematic representation of the quaternization of the dipolymer from BMDO and DMAEMA; hereby, v and w stand for the chain lengths of BMDO and DMAEMA in the finished dipolymer.

In the following, a representative example of this is given:

500 mg of the neutral copolymer were dissolved in 50 ml chloroform at 25° C. Then, 15 ml 1-bromododecane ($BrC_{12}H_{25}$) were added. The quaternization reaction was carried out over 3 d through stirring and heating to 40° C. in the oil bath. The solvent was subsequently removed. The reaction product was purified through dissolving the obtained ionic copolymer in chloroform twice and precipitating from n-hexane. The quaternization degree was determined by means of elementary analysis, wherein the amounts of bromine and nitrogen were compared with one another.

Different cationic copolymers were produced, modifying the molar ratio of the three initial components (BMDO, DMAEMA and 1-bromododecane.

Table 2 shows quaternization with $C_{12}H_{25}Br$ and the physical characteristics of the quaternized copolymers from BMDO (B) and DMAEMA (D).

| Copolymer composition B:D | Quaternization degree of D % | Solubility | Thermal stability (5% weight loss at ° C.) | DSC (glass temperature) ° C. (Tg) |
|---|---|---|---|---|
| 0:100 | 100% (white powder) | CHCl$_3$: yes methanol: yes (clear) water: no n-hexane: no | 202 | >150° C. |
| 10:90 | 98 (white powder) | CHCl$_3$: yes methanol: yes (cloudy) water: no n-hexane: no | 191 | 110-150 broad |
| 21:79 | 80 (white powder) | CHCl$_3$: yes methanol: yes (cloudy) water: no n-hexane: no | 206 | 112 |
| 30:70 | 89 (white powder) | CHCl$_3$: yes methanol: yes (cloudy) water: no n-hexane: no | 211 | 98 |
| 48:52 | 83 (white powder) | CHCl$_3$: yes methanol: yes (cloudy) water: no n-hexane: no | 211 | 45 |

Embodiment 3

Quaternization of Neutral Copolymers from BMDO (B) and DMAEMA (D) with Different 1-bromo-n-alkanes a) Quaternization with $BrC_pH_{2p+1}$ (p≥4)

500 mg of the poly(BMDO-DMAEMA-co-ester) were dissolved in 50 ml chloroform at room temperature. Then approx. 60 mmol of the alkylbromide were added to the reaction mixture, namely 14 ml 1-bromododecane or 8.5 ml 1-bromohexane, for example. The quaternization reaction was carried out over 3 days through stirring and heating to 40° C. in the oil bath. Subsequently, the crude product was isolated through distillation of the solvent at a rotary evaporator. The purification of the ionic copolymer obtained occurred through dissolving twice in chloroform and reprecipitating from n-hexane.

b) Quaternization with $BrC_pH_{2p+1}$ (2≤p≤4)

500 mg of the poly(BMDO-DMAEMA-co-ester) were dissolved in 40 ml chloroform at room temperature. Then approx. 60 mmol of the alkylbromide, i.e. 4.5 ml bromoethane, were added to the reaction mixture. The quaternization reaction was carried out at room temperature. As soon as the solution began to become cloudy, methanol was added until it became clear again. After 3 days of reaction time, the crude product was initially isolated through distillation of the solvent at a rotary evaporator. The purification of the ionic copolymers obtained occurred through dissolving twice in chloroform/methanol and reprecipitating from n-hexane.

Table 3 shows reaction times and quaternization degrees with the use of different bromoalkanes and at different quaternization times. Hereby, "conversion" stands for the percentage of DMAEMA units in the polymer which were quaternized.

| | Copolymer composition (molar ratio) | | Quaternization reagent $BrC_pH_{2p+1}$; | Quaternization time | Conversion |
|---|---|---|---|---|---|
| Run | BMDO | D | p = | (days) | (%) |
| 1 | 0 | 100 | 12 | 0.75 | 64 |
| 2 | 0 | 100 | 12 | 2 | 71 |
| 3 | 0 | 100 | 12 | 3 | 88 |
| 4 | 30 | 70 | 12 | 3 | 89 |
| 5 | 88 | 12 | 12 | 3 | 59 |
| 6 | 88 | 12 | 2 | 3 | 93 |

Embodiment 4

Use of the Quaternized Copolymers from BMDO and DMAEMA as Coatings

The cationic copolymers obtained from embodiment 2 were deposited as a coating on glass via electrospinning/electrospraying or film coating. Hereby, a solution of 10 to 20 wt.-% of the respective cationic copolymer according to the present invention in DMF was used.

a) Coating of Glass with an Ionic Polymer Through Film Coating

Copolymers according to the present invention with a quaternization degree of at least 4%, which had been quaternized with the help of BrCpH2p+1 (p≥8), were dissolved in CHCl$_3$ to a 10% solution. Each 100 µl of that solution were poured onto a glass microscope slide for microscopy (7.5 cm×2.5 cm). After complete drying of the coating, the contact angle was determined at approx. 90 degrees.

b) Coating of Glass with an Ionic Polymer Through Electrospinning

Different 10 to 20% solutions of cationic copolymers in a suitable solvent, such as CHCl$_3$, for example, were produced and, subsequently, electrospun. The tension at electrospinning was approx. 55 kV, the distance between capillary and substrate electrode was 12 cm, and the supply of polymer solution was 1 ml/h. Electrospinning was carried out at 20° C. The fibers obtained were collected on aluminum foil. The contact angle of the fibers was determined at approx. 120 degrees.

Embodiment 5

Production of Neutral Terpolymers from BMDO, DMAEMA and MMA

Cyclic ketene acetals such as 5,6-benzo-2-methylene-1,3-dioxepane (BMDO), N,N-dimethylaminoethylmethacrylate (DMAEMA) and a third comonomer, such as methylmethacrylate (MMA) for example, were terpolymerized through free radical polymerization to a hydrolytically degradable, neutral copolymer. In general, all terpolymerization reactions were carried out under argon atmosphere in pre-dried Schlenk flasks. AIBN was used as a radical initiator.

In a typical polymerization reaction, three monomers, BMDO (1.135 g 7 mmol), MMA (0.250 g 2.5 mmol) and DMAEMA (0.079 g 0.5 mmol) are provided in a ratio of 70:25:5, together with a mol-% AIBN in relation to the total amount of the monomer, under argon atmosphere in a Schlenk tube.

Low residuals of oxygen were removed through freezing once and unfreezing from the tube. The reaction was started through immersion of the reaction tube in a preheated oil bath at 70° C. After 20 h reaction time, the reaction mixture was diluted with CHCl$_3$ and precipitated with approx. 200 ml n-hexane. The copolymers were purified through dissolving in CHCl$_3$ and precipitation from n-hexane. The copolymers were dried in vacuum at 40° C. until a constant weight. The microstructure of the copolymers was characterized through 1D- and 2D-NMR. Through modification of the molar ratio of the comonomers in the mixture of starting materials, different terpolymers were produced from BMDO, MMA and DMAEMA. Hereby, the reaction conditions were largely chosen as described above.

Table 4 shows the mixtures of the starting materials used in this embodiment, the yield, and the composition of the terpolymers obtained, as well as their respective quaternization degree.

| Run | Mixture of starting materials (molar ratio) | | | Yield (%) | Terpolymer composition (molar ratio) | | | Quaternization degree (%) |
|---|---|---|---|---|---|---|---|---|
| | BMDO | MMA | D | | BMDO | MMA | D | |
| 1 | 30 | 65 | 5 | 81 | 12 | 82 | 6 | 39 |
| 2 | 50 | 45 | 5 | 57 | 23 | 69 | 8 | 56 |
| 3 | 70 | 25 | 5 | 40 | 35 | 54 | 11 | 68 |
| 4 | 80 | 15 | 5 | 33 | 42 | 44 | 14 | 70 |

Embodiment 6

Quaternization of the Terpolymers from BMDO, DMAEMA and MMA

The neutral precursor terpolymers from embodiment 4 were quaternized with alkylbromide. Hereby, the hydrolytically degradable, cationic copolymers according to the present invention were formed.

500 mg of the respective terpolymer from embodiment 4 were dissolved in 50 ml chloroform at room temperature. Then 15 ml 1-bromododecane (BrC$_{12}$H$_{25}$) were added to this solution. The quaternization reaction was carried out over 3 d under stirring and heating to 40° C. in the oil bath. The quaternized terpolymer was purified through dissolving the cationic terpolymer twice in chloroform and precipitating from n-hexane. The quaternization degree was determined by means of elementary analysis, wherein the amounts of bromine and nitrogen were compared with one another.

Embodiment 7

Production of Neutral Terpolymers from MDO, DMAEMA and MMA

Different neutral precursor terpolymers from MDO, DMAEMA and MAA were produced as described for the corresponding terpolymer from BMDO/DMAEMA/MAA.

Table 5 shows the results of the free radical terpolymerization of MDO, DMAEMA and MMA.

| Run | Mixture of starting materials (molar ratio) | | | Yield (%) | Terpolymer composition (molar ratio) | | |
|---|---|---|---|---|---|---|---|
| | MDO | MMA | DMAEMA | | MDO | MMA | DMAEMA |
| 1 | 30 | 65 | 5 | 81 | 15 | 79 | 6 |
| 2 | 50 | 45 | 5 | 70 | 30 | 64 | 6 |
| 3 | 70 | 25 | 5 | 64 | 40 | 50 | 10 |
| 4 | 80 | 15 | 5 | 55 | 55 | 35 | 10 |
| 5 | 70 | 20 | 10 | 52 | 40 | 40 | 20 |
| 6 | 70 | 15 | 15 | 49 | 40 | 32 | 28 |

Embodiment 8

Quaternization of the Terpolymers from MDO, DMAEMA and MMA

Different neutral precursor terpolymers were produced from MDO, DMAEMA and MMA and, subsequently, quaternized with 1-bromododecane, wherein all terpolymers comprised the same amount of MDO for ionomers (40 mol-%, see Table 4). Polymerization and quaternization occurred as described with the corresponding terpolymer from BMDO/DMAEMA/MAA.

Table 6 shows the results of the quaternization.

| | Copoly. composition (molar ratio) By NMR (%) | | | | Quaternization | |
|---|---|---|---|---|---|---|
| Run | MDO | M | D | $BrC_nH_{2n+1}$ | Conversion (by elementary analy.) | Degree of ionization (mol %) |
| 1 | 40 | 50 | 10 | 12 | 43 | 4.3 |
| 2 | 40 | 50 | 10 | 12 | 70 | 7 |
| 3 | 40 | 40 | 20 | 12 | 59 | 12 |
| 4 | 40 | 32 | 28 | 12 | 74 | 21 |
| 5 | 40 | 50 | 10 | 2 | 91 | 9 |
| 6 | 40 | 40 | 20 | 2 | 95 | 19 |

Embodiment 9

Adhesive Characteristics of the Cationic Copolymers

Different cationic copolymers according to the present invention were produced. BMDO or MDO was used as dioxepane. BMDO or MDO, respectively, were radically polymerized with DMAEMA and, optionally, with MMA. The precursor copolymers obtained in this way (dipolymers or terpolymers) were quaternized with 1-bromoalkane. The cationic copolymers obtained in this way comprised at least 4 mol-% cationic groups, i.e. at least 4 mol-% of the cationic copolymer were quaternary amines of DMAEMA.

Subsequently, solutions were produced from one of the cationic copolymers according to the present invention in chloroform, respectively (10 wt.-% copolymer). These solutions were successfully used, in order to adhere wood to wood, metal or glass, respectively, as well as glass to metal. The adhesive strength remained unchanged even after 24 hour treatment of the adhered parts in 60° C. hot water.

Embodiment 10

Biodegradability of the Cationic Copolymers

Cationic copolymers, which comprise at least 40% ester groups in the backbone and not more than 20 mol-% cationic groups, were processed into films. Films of these copolymers (10 cm×2 cm×0.1 mm) were buried in compost. After two weeks, considerable holes in the films were recognizable. This shows that cationic copolymers were already degraded within this short time by enzymes and microorganisms, wherein the composting rate depends, as is known, on the ground moisture, the temperature and the type of ground, as well.

The invention claimed is:

1. Hydrolytically degradable polyionic copolymerizates which are composed of
   a) 10 to 55 mol-% of a cyclic ketene acetal A,
   b) 4 to 90 mol-% of a methacrylic acid derivative B,
   c) 0 to 80 mol-% of a methacrylic acid derivative C, wherein the sum of the components A, B and C results in 100 mol-% and wherein the cyclic ketene acetal A is selected from

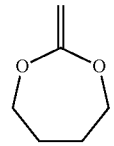

2-methylene-1,3-dioxepane
(MDO)
(I)

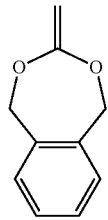

5,6-benzo-2-methylene-1,3-dioxepane
(BMDO)
(II)

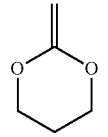

2-methylene-1,3-dioxane
(III)

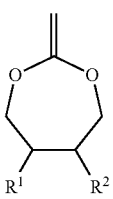

5,6-dialkyl-2-methylene-
1,3-dioxepane
(IV)

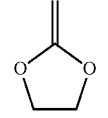

2-methylene-1,3-dioxolane
(V)

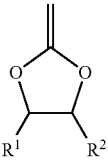

4,5-dialkyl-2-methylene-
1,3-dioxolane
(VI)

wherein R¹ and R² stand independently of one another for a linear or branched alkyl group with 1 to 12 carbon atoms, and the methacrylic acid derivative B is selected from
N,N-dimethylaminoethylmethacrylic acid (DMEAMA) according to formula (Xa)

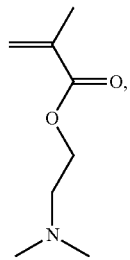
(Xa)

wherein 45% to 95% of the DMEAMA are available ionized in the form of a quaternary amine of the formula (Xb),

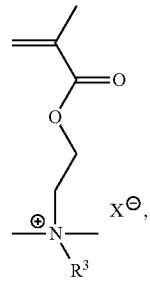
(Xb)

in such a way that the polyionic copolymerizate is a cationic copolymerizate, wherein
R³ stands for a linear or branched alkyl group with 1 to 12 carbon atoms or a benzyl group of the formula (VII)

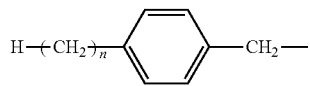
(XI)

where n=0-12 and X⁻ stands for fluorine, chloride or bromide,
and wherein the methacrylic acid derivative C is selected of compounds according to formula (VIII)

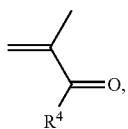
(XII)

wherein R⁴ is selected from
—OCH₃, —N(CH₃)₂, an oligoethylene glycol of the general formula —O—(CH₂—CH₂—O)$_m$H, an ω-methoxy-oligoethylene glycol of the general formula —O—(CH₂—CH₂—O)$_m$—CH₃, wherein m represents a natural number between 1 and 12, vinyl acetate, acrylonitrile, 2-hydroxyethyl methacrylate, N-vinylformamide, N-vinylacetamide, N-methyl-N-vinylacetamide, N-vinylcaprolactame, N-vinylpyrrolidone, N-2-hydroxypropylmethacrylamide, N-3-hydroxypropylmethacrylamide, N,N-di methylacrylamide, styrene, N,N-dimethylaminostyrene.

2. Hydrolytically degradable ionic copolymerizates according to claim 1, wherein the cyclic ketene acetal A is selected from 5,6-benzo-2-methylene-1,3-dioexepane (BMDO) and 2-methylene-1,3-dioxepane (MDO).

3. Hydrolytically degradable ionic copolymerizates according to claim 1, wherein the methacrylic acid derivative C is selected from

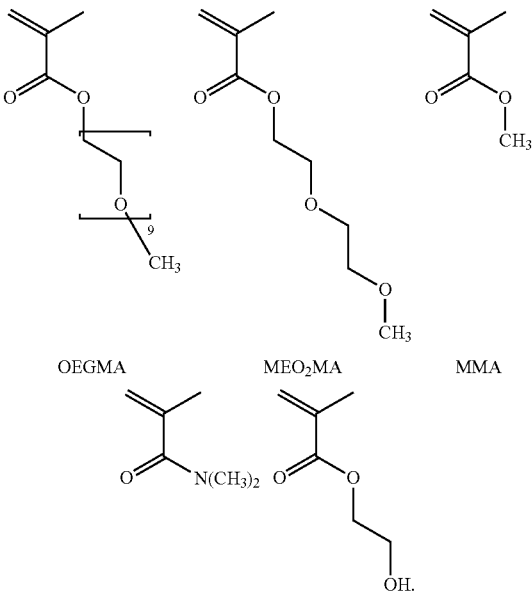

OEGMA          MEO₂MA          MMA

4. Hydrolytically degradable ionic copolymerizates according to claim 1, wherein they are composed of
a) 10 to 55 mol-% of a cyclic ketene acetal A,
b) 4 to 90 mol-% of a methacrylic acid derivative B,
c) 0 mol-% of a methacrylic acid derivative C,
wherein the sum of the components A and B results in 100 mol-%, in such a way that it is a dipolymer and wherein A, B and C are as defined above.

5. Hydrolytically degradable ionic copolymerizates according to claim 1, wherein they are composed of
a) 10 to 55 mol-% of a cyclic ketene acetal A, selected from MDO and BMDO,
b) 4 to 90 mol-% DMAEMA, which is available between 45% to 95% in the form of a quaternary amine
c) 0 to 30 mol-% of a methacrylic acid derivative C,
wherein the sum of the components A, B and C results in 100 mol-% and wherein the quaternary amine of the DMAEMA as well as the methacrylic acid derivative C are as defined above.

6. Hydrolytically degradable ionic copolymerizates according to claim 1, wherein they are composed of
a) 10 to 55 mol-% of a cyclic ketene acetal A, selected from MDO and BMDO,
b) 4 to 90 mol-% DMAEMA, which is available between 45% to 95% in the form of a quaternary amine
c) 0 to 80 mol-% MMA,
wherein the sum of the components A, B and C results in 100 mol-% and wherein the quaternary amine of the DMAEMA is as defined above.

7. Method for the production of cationic copolymerizates according to claim 1, comprising the following steps:
   a) free radical copolymerization of the components A, DMAEMA and C in the presence of a radical initiator under inert gas atmosphere,
   b) purification of the obtained neutral copolymer,
   c) reaction of the neutral copolymer with a quaternization reagent in such a way that 45% to 95% of DMAEMA are quaternized,
   d) purification of the ionic copolymer obtained in this way.

8. Method for the production of cationic copolymerizates according to claim 7, wherein initially DMAEMA is quaternized according to step c) and the quaternized DMAEMA is subsequently radically polymerized according to step a) with the components A and C in the presence of a radical initiator under inert gas atmosphere.

9. Method for the production of anionic copolymerizates according to claim 1, wherein the components A, B and C are polymerized in the presence of a radical initiator under inert gas atmosphere and the ionic copolymer obtained is subsequently purified.

10. A method of producing nanoparticles by using the hydrolytically degradable ionic copolymers according to claim 1.

11. In a method of adhering materials together using an adhesive, the improvement comprising using hydrolytically degradable cationic copolymers according to claim 1 as the adhesive.

12. In a method of using superhydrophobic materials, the improvement comprising using hydrolytically degradable cationic copolymers according to claim 1 as the superhydrophobic materials.

13. In a method of using biodegradable thermoplastic elastomer or biodegradable ionomer, the improvement comprising using hydrolytically degradable anionic copolymers according to claim 1 as the biodegradable thermoplastic elastomer or biodegradable ionomer.

* * * * *